Patented Dec. 2, 1952

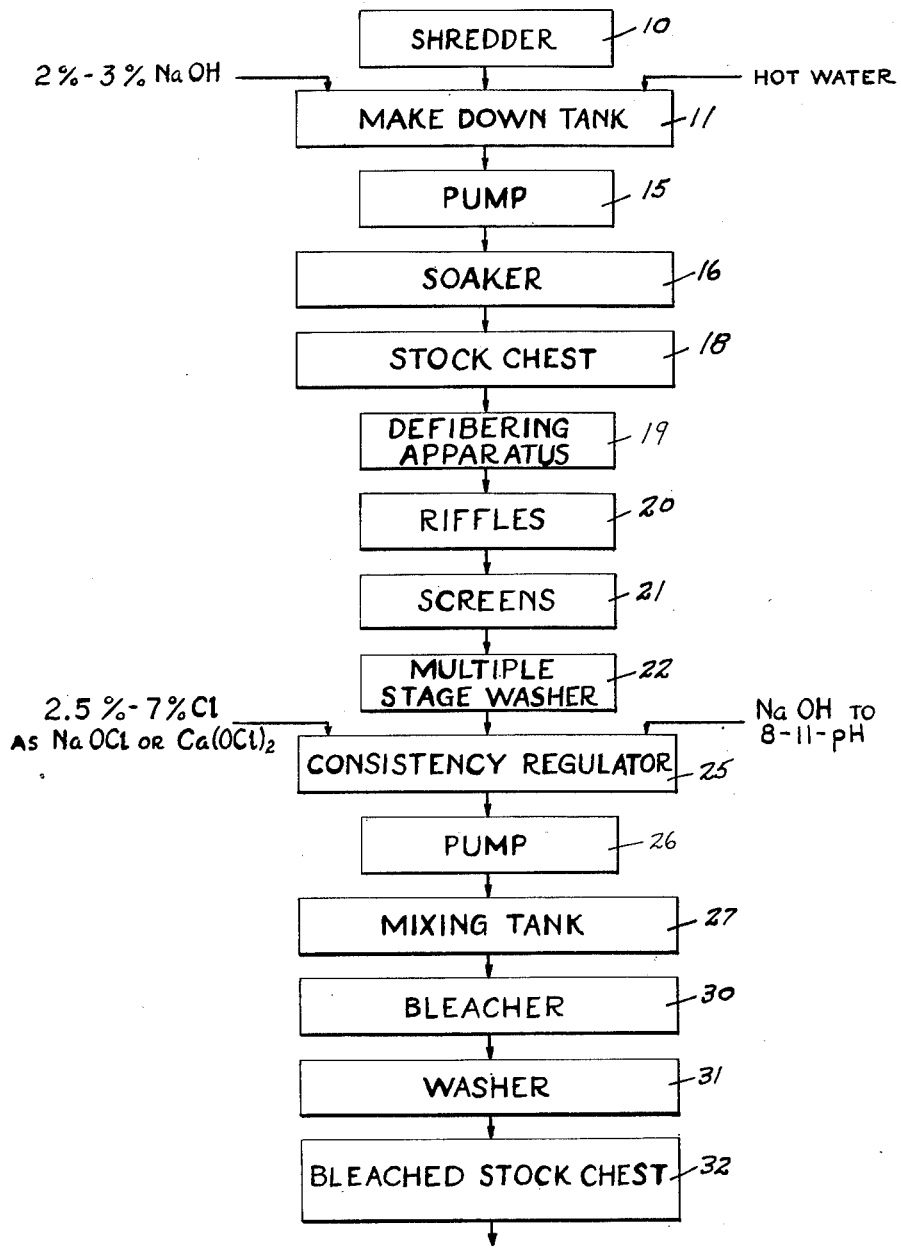

2,620,271

UNITED STATES PATENT OFFICE 2,620,271

DEINKING WASTE PAPER CONTAINING GROUNDWOOD

Harold T. Ruff and James F. Stevenson, Jr., Chillicothe, Ohio, assignors to The Mead Corporation, Chillicothe, Ohio, a corporation of Ohio Application July 24, 1945, Serial No. 606,796

3 Claims. (Cl. 92—1.5)

This invention relates to deinking and to bleaching of fibrous material, and more particularly to the deinking of fibrous material such as waste papers containing substantial or large quantities of ground wood and the bleaching of the fibrous material to give unusual qualities, especially of brightness to the ground wood.

One of the principal objects of the present invention is to provide a method of deinking and bleaching waste paper containing considerable quantities of ground wood to effectively and efficiently remove the ink and also to so bleach the resulting fibrous material as to restore it to desired color and brightness.

Another object of the invention is to provide such a method in which the ground wood waste paper is effectively deinked through the use of caustic solutions sufficiently concentrated to cause very substantial degradation in color and brightness of the ground wood as compared with the chemical pulp and in which the bleaching effectively restores or even increases the color and likewise restores and even markedly increases the brightness of the ground wood.

Still another object of the invention is to provide a method of bleaching which is effective with respect to ground wood fibrous material of degraded color and brightness to impart adequate color and high brightness comparable to high grade chemical fibrous pulp as used for the manufacture of high grade book or magazine paper for printing.

A further object is to provide a deinked and bleached mixture of chemical pulp and groundwood fibrous materials, containing substantial or large proportions of groundwood, in which the mixture of fibrous materials has a substantially uniform brightness approximating that of high quality "free" waste after the usual deinking and bleaching.

Another object is to provide paper for high grade printing such as magazine or book papers referred to, containing substantial or large quantities of bleached groundwood waste and having a brightness approximating that of paper "free" from groundwood, a brightness of not less than approximately 65–70.

Other objects and advantages will be apparent from the specification and claims and accompanying drawing.

The single figure of the drawing illustrates diagrammatically apparatus for use in practicing the present invention as used for deinking and bleaching book or magazine paper containing substantial or large quantities of groundwood.

It has long been a common practice to utilize waste paper to provide part of the fibrous constituent of the paper making furnish, especially in the manufacture of papers for printing such as better grades of magazine and book paper. No care or substantially no care is practiced in segregating one sort of printed waste paper from another as it is collected, and furthermore papers of several kinds may form part of a book or magazine and could be segregated only by tearing the book or magazine apart. Generally, waste paper as delivered at the paper mill, therefore, comes from a wide variety of sources, and is of varying fibrous constituency, and contains a generally indeterminate and more or less widely varying quantity of groundwood in the paper. Generally the term groundwood-free waste paper, or "free" waste as it is called, designates waste paper which contains not more than 3% of groundwood fibrous material; percentages in excess of that being considered as groundwood waste and treated as such. The groundwood fibrous material contains original constituents of the wood which are not present in the fibrous produced by chemical pulping, and therefore groundwood and chemical pulp fibers are differently responsive to such chemical treatments as have heretofore been used in the deinking process, and the resultant difficulties in operation become more marked and enlarged as the percentage of groundwood increases. Some high grade book and magazine papers, such as so-called machine coated book papers, may contain 50% or more of groundwood in the raw stock. The sorting of low groundwood or "free" waste papers from those containing substantial or large percentages of groundwood is possible of accomplishment at the paper mill but is time consuming and expensive. Of course, waste papers such as newsprint can be readily differentiated visually from waste papers such as good magazine or book paper. However, many of the better magazines use coated paper and this makes necessary much greater care and more expensive operations in effecting sorting. The sorting can be readily accomplished by sprinkling chemicals upon the paper which will produce a different appearance upon groundwood waste from that produced on free waste. This is complicated further, however, by the fact that many magazines, for example, will be in part of groundwood paper and in part of free paper, and if such waste is to be segregated it would be necessary to tear the magazines apart. These instances are cited as illustrative of the very serious and expensive operating difficulties attending upon the sorting of waste to separate free waste from groundwood waste. In addition there is a still further and very serious practical problem, i. e., even if sorting is effective, if large quantities of groundwood are thus separated and discarded to avoid processing such groundwood waste along with the free waste the amount of the free waste left is greatly reduced, in practical operations to as much as 50% of the total waste purchased by the mill. This has two very serious aspects, first, in addition to the time and expense incident to the operations of separating the waste, if the groundwood waste is discarded and resold, as a salvaging operation, the price at which it is resold is considerably below the price which is paid for it originally, and, secondly, if such considerable quantities of groundwood waste as referred to are discarded it is difficult and impossible to secure adequate amounts of free waste for satisfactory paper making operations.

We have found that, through the present invention, waste papers containing large quantities of groundwood may be readily deinked, without any unusual operating difficulties or costs, and that the resulting defibered material may be bleached so as to restore the fibrous material to the desirably white color, despite very substantial degradation of color during the deinking, and also so as to impart brightness equal to good grades of chemical pulp. This has permitted of solving very serious problems in operation as it permits of using lower cost waste containing large quantities of groundwood, and nevertheless securing from this waste mixed chemical pulp and groundwood fibrous material which is highly satisfactory for the making of such high grade magazine and book printing papers referred to. Such mixed waste fibrous materials, even when containing as much as 60% or even more of groundwood, will be of substantially uniform color and brightness, and of color and brightness approximating that of high grade deinked and bleached "free" waste. Such high groundwood waste has been satisfactorily used in the furnish for producing high quality book or magazine paper, of color and brightness adapted for the best grades of magazine printing. And this astonishing result is accomplished without the necessity of peculiarly difficult or costly deinking operations or apparatus and with the bleaching operations effective to provide the desired color and brightness of all of the fibrous furnish even though the deinked furnish may contain large percentages of groundwood greatly degraded in color and brightness from the deinking procedure.

While deinking has been widely practiced in the paper industry for many years it is nevertheless recognized that adequate and proper removal of the ink by chemicals without adversely affecting the fibrous material, at least as to its color and brightness, is far from a simple problem. In general, deinking has consisted of chemical treatment to act upon the binder constituents of the ink and react or dissolve them so as to loosen or separate the ink and its pigment from the fibers and also some mechanical treatment for causing physical separation of the pigment and other ink constituents from the fiber, if they tend to adhere to the fibers even after chemical treatment. The chemical treatment had definite limitations which affected its action upon the ink, particularly the inks used in printing better grades of magazines and books, such as inks having thermoplastic or thermosetting resinous constituents, and drying to hard films, as such might require sufficiently drastic chemical treatment that the fibers would be too adversely affected. And the mechanical treatment likewise requires careful control as otherwise the pigment and particles of loosened ink may be physically pounded or worked into the fibers so that although too small to be visible as particles nevertheless they will adversely degrade the color and finish even against normally adequate bleaching.

In the practicing of the present invention these difficulties are avoided and, as stated, the deinked and bleached furnish of high finish may be readily produced, even with the very large percentages of groundwood. As illustrating a preferred embodiment in the practicing of the invention, which has been satisfactorily used in large scale commercial operations for the manufacture of high grade book or magazine paper such as used in printing of high grade magazines, the invention is described in connection with the deinking and bleaching of waste paper containing up to approximately 40% groundwood. In such practicing of the invention during the sequential operations illustrated in the drawing flow sheet, the waste paper is first passed through a shredder 10, where the paper is mechanically shredded or cut or torn into small pieces. In practice no effort is made to sort the waste paper—i. e., to separate "free" from groundwood containing book waste—as large percentages of groundwood are readily taken care of in the practicing of this process. The shredder is preferably located above the make down tank 11, so that the shredded paper may move by gravity into this make down tank. A solution containing alkaline material equivalent to approximately 2–3% sodium hydroxide on the air dry waste is present in the make down tank 11, and the shredded paper is subjected to the action of this solution in the tank 11 for a period sufficient to cause thorough wetting of the waste paper with the solution and putting it in condition so that it may be pumped to the next stage in the process. The length of time the paper is maintained in this tank 11 is not particularly critical of itself and in practice depends to a considerable extent upon the available storage capacity for the furnish, and the rate at which the defibered and bleached material must be fed along to the paper making machine. Very satisfactory results have been secured in the operations referred to, by adding caustic soda and hot water to the make down tank 11, at a rate co-ordinated with the rate at which the shredded paper is fed into the tank 11 and also pumped from it for further treatment, with the caustic soda solution and water being so introduced as to maintain substantially the 2–3% concentration of sodium hydroxide.

From the make down tank the waste paper in the caustic solution is transferred by the pump 15 to a soaker tank 16. Groundwood fibrous material is quite responsive to the action of the caustic soda and the concentration and temperature at which it is soaked during deinking must be properly controlled or else too adverse effects in deinking will be secured to permit of adequate efficient bleaching by formerly used processes. In the embodiment described however even ground wood which is quite abnormally degraded in color and finish during deinking may be readily restored to color and finish comparable to that of free waste by the practicing of this invention. The temperature in the soaker tank is maintained within the range of approximately 180–200° F. and the material is left in this tank at such a temperature for a period of approximately three hours. The soaker tank is about the same in construction as the make down tank 11, but is constructed to retain the fibrous material therein so that it will be subjected for the longer period of three hours, as stated, to the 2–3% caustic soda solution at the 180–200° F. temperature. Treating groundwood with caustic solution of such concentration and such a temperature causes quite substantial discoloration, or degradation of color of the groundwood material because of the reaction between the caustic and the non-cellulosic constituents of the groundwood. As a good grade of deinked and bleached chemical pulp such as used in book and magazine paper referred to for high quality printing will have a brightness of approximately 70, or perhaps somewhat more, the inadequacies of the usual bleaching process as practiced in connection with deinking at caustic concentrations sufficiently high, in the range referred to, to give efficient and effective and rapid deinking would result in the fibrous waste being of such comparatively low brightness that it could not be used for making the desired high quality book paper. In fact waste of brightness of the order of 50–55, when used in the normal proportions in the furnish for the paper machine, would give a dirty grayish color to the entire web rendering it quite undesirable for commercial purposes or even useless for magazines of the kind referred to.

The waste from the soaker, so degraded in color and finish, is passed to a stock chest 18, which feeds the chemically treated material into a suitable defibering apparatus 19. Satisfactory results have been secured using a Wiener defibering apparatus. However, other defibering mechanisms may be adequately used. For example, an attrition mill as used in the paper industry with oppositely rotating disks having plates constructed for defibering or pulping, as well understood, may be used but the defibering may be readily accomplished without the disks being set as closely together as in producing virgin pulp in ordinary practice. In fact satisfactory results have been secured, operating upon the material treated as described above, with the plates open as much as one-sixteenth to a quarter of an inch; which, as is well understood, is an enormously wide setting for the plates of such an attrition mill.

The defibered stock leaving the mechanism 19 is flowed through riffles 20 of usual construction to separate heavier sediment and extranous material, and is then passed over one or more screens 21.

The material from the screens is passed to a suitable washer 22. Very satisfactory results have been secured with a multiple stage washer such as the Lancaster or Thompson type, in which the stock is cascaded from one stage of the washer into another. Three or four stage cylinder washers, with the stock cascading from one to the other with a slight water leg have given very satisfactory results.

The washed stock is then passed to a consistency regulator tank 25, where the bleaching constituents are added and also an alkaline material such as caustic soda, soda ash, and the like. A common commercial practice in bleaching free waste papers, in the book and magazine paper industry, has been to use about 1% of chlorine as hypochlorite on the pulp with about one to three hours of bleaching time. On free book paper waste from magazines of the character referred to, and the like, we have found that this has usually given a brightness of about 68–70, although of course on some higher quality waste paper such as free ledger waste brightnesses as high as 75–80 have been attained. But with waste having such a large percentage of groundwood as 10–40%, as referred to, the brightness when deinked and bleached according to the above established practice was of the order of 50–55.

In the procedure as herein described, however, with 40% of groundwood in the waste paper, approximately 6% of chlorine as sodium hypochlorite (NaOCl) is added into the consistency regulator 25 and this very high percentage of hypochlorite is satisfactorily alkalinized by adding an alkaline material which will bring the pH up to 10.5–11.5, sodium hydroxide or other strong alkaline material such as soda ash being suitable. Approximately 2% of NaOH, as a buffer, will bring the pH to this preferred range. The temperatures are satisfactorily maintained within the range approximately 90–110° F. during the bleaching operation, the consistency, with 40% groundwood is controlled to be about 4–8%, approximately 4.6% being satisfactory for handling and for bleaching results, and the bleaching operation is continued for a period of two to four hours depending somewhat upon temperature and the percentage of groundwood. With approximately 6% of chlorine present as hypochlorite with 40% groundwood pulp, and sufficient alkaline material such as caustic soda, added as a buffer to provide the equivalent of about 2% of caustic soda, satisfactory results are attained with the temperature approximately 92–94° F.

By the use of large quantities of hypochlorite, and a suitable buffer, with pH properly maintained the bleaching can be effected primarily by the liberated oxygen which destroys coloring matter, and it is believed that this gives the very superior results as to brightness attained.

The stock having been regulated as to consistency and as to the proper amount of hypochlorite and buffering caustic in the tank 25 is transferred by the pump 26 to a mixing tank 27. This pump is preferably a centrifugal pump which tends to initiate agitation, and the mixing tank is provided with agitating means, the stock being retained therein for about five minutes to secure good agitation. From this mixing tank 27 the thoroughly mixed material passes to the bleacher 30. As thus far described the process is practiced as a batch process and the bleachers, in such practice, have been constructed to hold a batch of 4400 pounds of pulp (on a bone-dry basis) at approximately 5% consistency. Satisfactory results have been secured with a bleacher consisting of cylindrical concrete chests with slow arm agitators.

The temperature at which the bleaching is conducted has substantial controlling effect. Temperatures from 80–120° F. are satisfactorily effective, the higher temperatures shortening the bleaching time with some loss in brightness while at temperatures lower than stated the bleaching time becomes, practically, excessive. Very satisfactory results as to bleaching time with extra high brightness have been attained within the temperature range of 90–110° F. as stated. It should also be stated that higher quantities of buffer material are required at high temperatures. The consistency during the bleaching operation has a modifying effect, but where sodium hypochlorite is used moderate departures from 4–8% range referred to will not have marked effect; and even increases in consistency have so far been found to have no very substantial effect either in brightness or bleaching time. If calcium hypochlorite is used, however, a consistency of about 4% seems to be best from the point of view of brightness, and increasing the consistency to as much as 10% will ordinarily give a decrease in brightness of about two points. Increasing the chlorine and also increasing the bleaching time, with proper buffering and other conditions maintained, will improve the brightness somewhat but not in proportion with the increase in chlorine, and with the quantity of bleaching agent and the time of bleaching referred to above have been found to give very satisfactory results in a practical economic range. Either sodium hypochlorite or calcium hypochlorite may be satisfactorily used and the high brightness secured. Calcium hypochlorite has been found ordinarily to give somewhat better brightness which may be due to a filler effect. Also calcium is cheaper than sodium, but either may be satisfactorily used as the filler effect is not objectionable within the ranges used. Likewise calcium hydroxide may be used for the buffer material in place of sodium hydroxide and this too seems to give slightly better brightness but again a filler effect ($CaCO_3$) is involved. For practical mill operations the hypochlorite and the buffer satisfactorily have been added conjointly in the consistency regulator 25 and this gives the satisfactorily high brightness of 68–70 referred to. However, it has been found that sequential addition of the buffer to the bleaching solution gives somewhat higher brightness, but as this involved additional piping, etc., in order to introduce the constituents consecutively, the satisfactory method of adding the two materials at the same time is illustrated in the drawing. The sequential operation will be just as satisfactory, and in fact will give somewhat higher brightness and therefore may be preferable.

As stated the entire bleaching operation is carried out with the pH on the alkaline side. And it has been found that within the range of 9–11 pH the resultant brightness attained remains substantially constant. If the pH falls below 9 the rate of bleaching is higher but poorer brightness is obtained, and at pH 8 this change is very appreciable. A pH of 9.5 to 10.5 is a desirable range, although the pH may be allowed, satisfactorily, to decrease toward the end of the bleaching operation but nevertheless the entire bleaching should preferably be carried out on the alkaline side. The bleached material is pumped to the washer 31 which is preferably a vacuum washer, where it is suitably washed and the washed material is then pumped or passed by gravity to the bleached stock chest 32 from which it may be passed into the furnish make up system and on to the paper machine.

This process is effective for waste papers having low groundwood content as well as papers having groundwood contents up to as much as 60%.

As illustrative of conditions which may be obtained with waste papers having different percentages of groundwood, the following table sets forth conditions which have actually been satisfactorily attained:

|  | Low Groundwood 10–30% | High Groundwood 40–60% |
|---|---|---|
| Temperature °F | 90–110 | 90–110 |
| Time hrs | 2–4 | 2–4 |
| Consistency percent | 4–6 | 4–6 |
| pH start of bleach | 10.5–11.5 | 10.5–11.5 |
| pH end of bleach | 7.5–8.5 | 7.5–8.5 |
| Chlorine as NaOCl or $Ca(OCl)_2$ percent | 2.5–3.5 | 6–7 |
| Buffer (NaOH) do | 0.5–1.0 | 2–3 |

The above conditions gave 65–70 brightness pulp.

Likewise for purposes of comparison as between the present process of deinking and bleaching, and former practices using the same conditions for deinking but using the bleaching conditions referred to as commonly used in commercial operations for waste paper containing no groundwood, the following comparative figures are given by way of illustration:

|  | Bleaching Step of present invention | Bleaching Step of old commercial process |
|---|---|---|
| Percent chlorine on bone dry pulp | 3.1 | 1.0 |
| Percent NaOH for buffer on bone dry pulp | 0.7 | none |
| Bleaching time, hrs | 2½–3½ | 2–3 |
| Bleaching consistency | 4.75 | 3.5–5.5 |
| Bleaching temperature, deg. F | 92–94 | 94–96 |
| Residual g. p. l. $Cl_2$ | 0.1–0.3 |  |
| pH end of bleach | 8–9 |  |
| Ave. brightness bleached stock | 66 | 54–57 |
| Unbleached brightness | 50–56 | 52–53 |
| Percent Groundwood in waste | 8–25 |  |
| Max. Groundwood in waste percent | 40 |  |

While the cost of bleaching under the present process is somewhat in excess of the cost of the old commercial bleaching of free waste paper nevertheless this cost is insignificant when it is considered that sorting to separate groundwood waste adds materially to the cost of the waste paper and also cuts down the quantity which is available for use and secondly when it is realized that despite the degradation in color and brightness of the groundwood waste which occurs during the deinking step the groundwood is nevertheless so bleached that its brightness is brought up to the range 65–70 and generally to approximately 70, which is about the same as the brightness which is secured from high grade free book paper waste. This therefore permits of securing and using much larger quantities of waste paper having widely varying quantities of groundwood and still having the fibrous material of the deinked and bleached groundwood pulp and of the entire furnish all of substantially the same brightness to give a high grade paper, such as the book or magazine paper referred to, of the brightness formerly attained with high grade chemical pulps.

While the method and product herein described constitute preferred embodiments of the invention, it is to be understood that the invention is not limited to this preferred method and product, and that changes may be made therein without departing from the scope of the invention which is defined in the appended claims.

What is claimed is:

1. In the treatment of groundwood-containing waste paper including paper printed with inks dried to a hard film to effect deinking and bleaching thereof, the method which consists in agitating the waste paper with 2 to 3% caustic soda on the air dry waste, maintaining said chemical treatment under controlled conditions of temperature and time to remove or loosen substantially all of the ink from the fibrous material of the paper with concomitant large degradation of color and brightness of the groundwood fibrous material, subjecting such chemically treated material to defibering action to effect substantially complete defibering and substantially complete removal of the ink from the fibers, washing said material, and effecting bleaching of said material by agitating the fibrous material at a consistency of about 4% to 8% in a solution of a hypochlorite of an alkali metal buffered with an alkaline material, with the percentage of hypochlorite sufficient to provide chlorine within the range of 2.5% to 7% and sufficient alkali buffering material to maintain the pH within the range 8 to 11 pH throughout the bleaching period, whereby the bleached brightness of the bleached material will be within the range 65 to 70.

2. In the treatment of groundwood-containing waster paper including paper printed with inks dried to a hard film to effect deinking and bleaching thereof, the method which consists in agitating the groundwood waste paper at a consistency of approximately 5% with 2 to 3% caustic soda on the air dry waste, maintaining said chemical treatment over a period of approximately three hours within a temperature range of 180°–200° F. with concomitant effective loosening of substantially all of the ink from the fibrous material and large degradation of color and brightness of the groundwood fibrous material, subjecting such chemically treated material to defibering action to effect substantially complete defibering separation and substantially complete removal of the ink from the fibers, washing said material, and effecting bleaching of said material by agitating the fibrous material at a consistency of about 4% to 8% for a period within the range of substantially two to three hours with a solution of a hypochlorite of an alkali metal buffered with an alkaline material, said buffered bleaching solution containing hypochlorite sufficient to provide 2.5% to 7% of chlorine and the equivalent of .5% to 3% of caustic soda as the alkali buffering material, both figured on the bone dry fibrous material, whereby the bleached brightness of the bleached material will be within the range 65 to 70.

3. In the treatment of groundwood-containing waste paper including paper printed with inks dried to a hard film, the method which consists in subjecting waste paper containing groundwood fibrous material within the range of 10% to 60% to a deinking and defibering treatment comprising agitating the waste paper with 2% to 3% caustic soda for prolonged period at elevated temperatures with the reactivity of the chemical material upon the groundwood coordinated with the length of the period of treatment and the temperature maintained during such period to give substantially complete loosening of the ink with concomitant large degradation of color and brightness of the groundwood fibrous material, and subjecting the deinked material to bleaching by agitating the defibered and deinked material at a consistency of about 4% to 8% in a solution of hypochlorite of an alkali metal buffered with an alkaline material, said buffered bleaching solution containing hypochlorite sufficient to provide 2.5% to 7% of chlorine and the equivalent of .5% to 3% of caustic soda as the alkali buffering material, both figured on the bone dry fibrous material, and limiting said bleaching action to a period during which the pH of the bleaching solution is maintained within the range of 8 to 11 pH.

HAROLD T. RUFF.
JAMES F. STEVENSON, Jr.

REFERENCES CITED

The following references are of record in the file of this patent:

UNITED STATES PATENTS

| Number | Name | Date |
|---|---|---|
| 977,013 | Hubbard | Nov. 29, 1910 |
| 1,327,590 | Burby | Jan. 6, 1920 |
| 1,555,674 | Kellner | Sept. 29, 1925 |
| 1,576,994 | Plumstead | Mar. 16, 1926 |
| 1,880,049 | Richter | Sept. 27, 1932 |
| 1,925,372 | Darling | Sept. 5, 1933 |
| 1,953,191 | Richter | Apr. 3, 1934 |
| 1,992,977 | Wells | Mar. 5, 1935 |
| 1,993,362 | Crisp | Mar. 5, 1935 |
| 2,077,059 | Snyder | Apr. 13, 1937 |
| 2,208,652 | Whitehead | July 23, 1940 |
| 2,221,294 | Bragg | Nov. 12, 1940 |
| 2,376,688 | Goldstein et al. | May 22, 1945 |

OTHER REFERENCES

Paper Trade Journal, December 16, 1943, pages 28 and 29.

Paper Trade Journal, February 21, 1946, pages 35–37.

Deinking of Paper, by West (1943), pages 5–11, published by Institute of Paper Chemistry, Appleton, Wisconsin.